United States Patent [19]

Oehlke et al.

[11] Patent Number: 4,508,477
[45] Date of Patent: Apr. 2, 1985

[54] FASTENING DEVICE

[75] Inventors: Donald N. Oehlke, Troy, Mich.; Ralph A. MacRae, Burlington, Canada; James Crammond, Hamilton, Canada; Hans R. Rattmann, Burlington, Canada

[73] Assignee: Eaton Corporation, Cleveland, Ohio

[21] Appl. No.: 430,449

[22] Filed: Sep. 30, 1982

[51] Int. Cl.³ .............................................. F16B 37/04
[52] U.S. Cl. ..................................... 411/174; 411/437
[58] Field of Search .............. 411/437, 436, 527, 172, 411/173, 174, 175; 248/73

[56] References Cited

U.S. PATENT DOCUMENTS

| 2,228,584 | 1/1941 | Place | 85/36 |
|---|---|---|---|
| 2,239,797 | 4/1941 | Tinnerman | 85/36 |
| 2,318,708 | 5/1943 | Parr | 85/36 |
| 2,378,258 | 6/1945 | Tinnerman | 411/174 |
| 2,434,844 | 1/1948 | Flora | 151/21 |
| 2,494,882 | 1/1950 | Kost | 151/21 |
| 2,581,481 | 1/1952 | Hartman | 411/175 |
| 2,672,905 | 3/1954 | Hartman | 411/175 |
| 2,901,938 | 9/1959 | Van Buren, Jr. | 85/32 |
| 3,308,708 | 3/1967 | Holton | 85/32 |
| 3,362,278 | 1/1968 | Munse | 85/32 |
| 3,426,818 | 2/1969 | Derby | 411/175 |
| 3,669,170 | 6/1972 | Schuster | 411/175 |
| 4,200,027 | 4/1980 | Oehlke | 85/36 |

FOREIGN PATENT DOCUMENTS 2489903  3/1982  France ..................... 411/437

Primary Examiner—Thomas J. Holko
Assistant Examiner—Adrian H. Whitcomb, Jr.
Attorney, Agent, or Firm—C. H. Grace; A. E. Chrow

[57] ABSTRACT

Disclosed is an improved fastening device (70, 72, 74, 76, 78) for securement of a threaded member such as a screw ("s") to an article such as a panel or the like. The device is of the type having a base member (12) having a frusto-conical projection (14) having a lower and higher helical edge (16, 16a) surrounding an opening (40, 42') therethrough which in conjunction with a pair of resilient finger portions (30, 32') having respective free-ends (34, 36) spaced-apart from each other along an axis ("y—y") defined therebetween of which one finger portion is displaced a distance ("x") further from the base member than the other finger portion to provide a means of engaging the threads of the threaded member. Edges (16, 16a) are separated from each other by means of a slot (38) which, by extending beneath the finger portion having the higher free-end in a direction substantially transverse to axis "y—y", is able to prevent cocking and cross-threading of the threads of the threaded member which has been a problem in the past particularly when the threaded member has a blunt rather than a pointed end.

13 Claims, 12 Drawing Figures

FASTENING DEVICE

INTRODUCTION

This invention relates generally to a fastening device for securing an externally threaded member such as a screw that utilizes a combination of spaced-apart free ends of a pair of diammetrically opposed resilient fingers and helically deformed edges of an aperture through which the threaded member is inserted for engagement with the threads of the threaded member and more particularly to such device that includes a slot portion extending radially from the aperture as a means of separating higher and lower portions of the helical edge. This invention is an improvement of the fastening device disclosed in U.S. Pat. No. 3,308,708 assigned to the assignee of the present invention, the disclosure of which is incorporated herein by reference.

BACKGROUND OF THE INVENTION

Fastening devices for securing an externally threaded member such as a screw which utilize one or more resilient fingers or helically deformed edges surrounding an aperture through which the threaded member is inserted or combinations of both for engagement with the threads of the threaded member are well known in the art. Examples of fasteners utilizing free ends of resilient fingers or torques for engagement with the threads of a threaded member are disclosed in U.S. Pat. Nos. 2,239,797; 2,318,708; and 4,200,027, respectively. Examples of fastening devices which utilize a helically deformed edge of an aperture through which the threaded member is inserted are respectively disclosed in U.S. Pat. Nos. 2,228,584; 2,901,938; and 3,362,278. Examples of fasteners which use a combination of resilient fingers or tongues and a helically deformed edge of an aperture surrounding an opening through which the threaded member is inserted are respectively disclosed in U.S. Pat. Nos. 2,434,844; 2,494,882; and 3,308,708. The present invention concerns fasteners of the latter type particularly of the type disclosed in U.S. Pat. No. 3,308,708 involving the use of resilient fingers in combination with a helically warped edge of an aperture through which the threaded member is inserted for engagement of the free ends of the resilient fingers and the helically formed edge with the threads of the threaded member.

Although fasteners of the combination type described above, and in particular described in U.S. Pat. No. 3,308,708, may be used to advantage in providing a means of securing a threaded member, it has been found that such fasteners have a tendency to cock (i.e. tilt) the threaded member and cause undesirable cross-threading to occur. The problem has been found to be particularly prevalent when the leading end of the threaded member is flat rather than pointed (such threaded members in the form of screws are typically referred to as "blunt nosed" screws). In view of the above, a need exists to provide a fastener of the combination type described above that minimizes the tendency for cocking and cross-threading of the threaded member, particularly threaded members having flattened ends rather than pointed.

SUMMARY OF THE INVENTION

Accordingly, it is an object of this invention to provide an improved fastening device for securing an externally threaded member of the type utilizing a combination of resilient fingers and helically formed edges surrounding an aperture through which the threaded member is inserted that minimizes the tendency for cocking and cross-threading the threaded member.

It is another object of this invention to provide an improved fastening device for securing an externally threaded member of the type utilizing a combination of resilient fingers and helically formed edges surrounding an aperture through which the threaded member is inserted that is able to minimize the tendency for cocking and cross-threading of the threaded member regardless of whether the leading end of the threaded member is relatively flattened or pointed.

DESCRIPTION OF THE PREFERRED EMBODIMENTS

Figure 2:
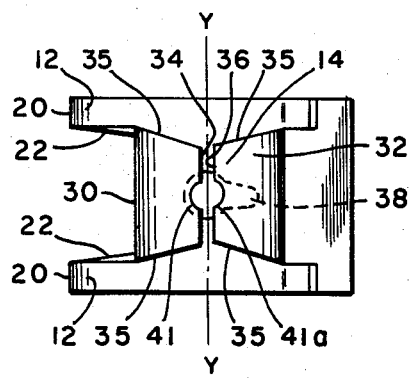
FIG. 2 shows a top plan view of the fastening device of FIG. 1.
Figure 3:
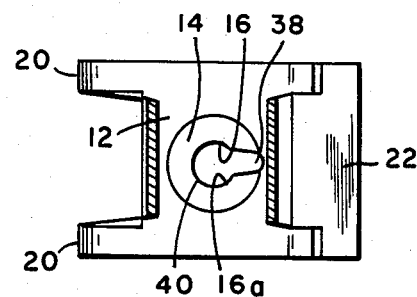
FIG. 3 shows a view taken along line 3—3 of FIG. 1 with finger portions 30 and 32 removed.
Figure 1:
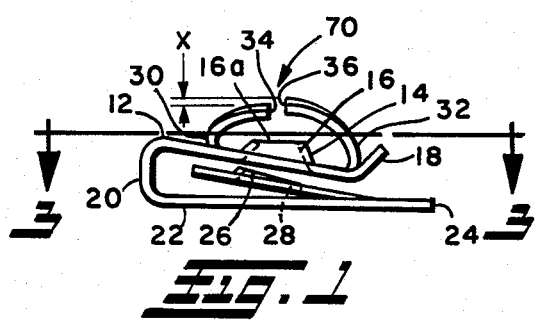
FIG. 1 is a side elevation view of an embodiment of the fastening device of the invention that incorporates a clip for securing the fastener to an article such as a plate.
Figure 4:
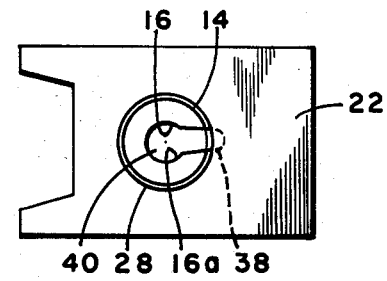
FIG. 4 shows a bottom plan view of the fastening device of FIG. 1.

FIG. 1 shows an embodiment of the fastening device of the invention in the form of device 70. Device 70 has a base member 12 having an aperture 40 therethrough as illustrated in FIG. 3. Aperture 40 is dimensionally adapted to receive the threaded member to which device 70 is to be secured. The marginal edges of aperture 40 are deformed into a generally frusto-conical projection 14 that projects upwardly from base member 12. Projection 14 has a helical edge extending between a higher portion 16 and a lower portion 16a thereof that are separated by a slot or slot portion 38 as shown in FIGS. 2, 3 and 4. The helical slope between edge portions 16 and 16a is preferably substantially the same as the pitch of the external threads of the threaded member to be inserted through aperture 40 and provides one of the thread engaging means for securing the threaded member to device 70. Projection 14 is also referred to a "helical thread impression" and is generally well known in the prior art.

A pair of resilient finger portions 30 and 32 made integral with base member 12 extend upwardly and angularly inwardly from base member 12 on opposite sides of aperture 40 as shown in FIG. 1. Finger portions 30 and 32 extend radially inwardly towards one another in overhanging relationship to frusto-conical projection 14. Finger portions 30 and 32 have free-ends 34 and 36 respectively that face towards each other and are spaced-apart from one another along axis "y—y" as shown in FIG. 2. Aperture 40 is substantially axially aligned with a vertical plane drawn through axis y—y. Free-ends 34 and 36 of finger portions 30 and 32 are respectively axially off-set relative to one another such that free-end 36 of finger portions 32 is higher relative base member 12 than free-end 34 of finger portion 30 by distance "X". As better shown in FIG. 10, distance "X" is preferably substantially the same as the thread pitch of the threaded member to be secured to device 70. The inner diameter of the helically formed edge between lower portion 16a and upper portion 16a and the space between free-ends 34 and 36 along axis "y—y" are dimensionally adapted to engage with the threaded member inserted upwardly through aperture 40 and the space between free-ends 34 and 36 as described in more detail with respect to FIGS. 10 and 11.

Resilient arm 22 of base member 12 extends downwardly from base member 12 at intersection 20 and preferably extends angularly upwardly towards base member 12 to an end 24 thereof that is spaced-apart from body member 12 for a distance sufficient for body member 12 and arm 22 to coact with each other to provide an open-ended clip. The length of arm 22 at intersection 20 may be varied to provide the amount of flexibility desired between arm 22 and base member 12 and the distance between arm 22 and base member 12 may be varied to accommodate the particular thickness of the article, such as a plate, to which device 70 is to be secured. Generally, arm 22 and base member 12 may be tapered in any manner as a means of enhancing the flexibility therebetween to the degree desired. End 18 of body member 12 is preferably flared upwardly away from arm 22 to facilitate inserting an article such as a plate or the like that is dimensionally capable of being inserted through the opening between base member 12 and arm 22.

Arm 22 has an opening 28 therethrough that is substantially coaxially aligned with aperture 40 and dimensionally adapted to receive the threaded member to which device 70 is to be secured and enable the threaded member to be inserted through aperture 40 and thence turned such that it moves upwardly and the threads thereof engage with the helical edge between high portion 16 and low portion 16a and thence with free-ends 34 and 36 respectively of finger portions 30 and 32. Arm 22 may have a warped edge 26 which engages with the marginal portions of an aperture, not referenced, through the article which is to be secured to device 70.

Thus, device 70 is able to be clipped onto an article such as a panel or the like having an opening therethrough that aligns substantially coaxially with opening 28 which in turn aligns substantially coaxially with aperture 40 which in turn aligns with a verticle plane drawn along axis "y—y" such that the threaded member can be inserted through opening 28 and the opening in the article and thence through aperture 40 for engagement with the helical edge extending between high portion 16 and low portion 16a.

FIG. 2 is a top view of device 70 of FIG. 1 showing slot portion 38 extending radially outwardly through projection 14 from aperture 40 so as to separate high portion 16 and low portion 16a of the helically formed edge of projection 14 as further shown in FIG. 3. Fasteners utilizing a combination of helically formed edges and the free-ends of fingers or tongues have heretofore had the problem that the threaded member would often cock as it was turned for securement with the fastener and often would suffer cross-threading as a result of the cocked position and that such was particularly characteristic when the threaded member had a flattened or blunt end rather than pointed. Heretofore, such fasteners characteristically disposed the slot portion through the helical projection in a direction substantially parallel to the axis defined between the free ends of the finger portions. It has been surprisingly discovered that the tendency for cocking and cross-threading of the threaded member is markedly reduced when slot 38 extends radially outwardly from aperture 40 in a direction substantially transverse to axis "y—y" towards (and beneath) the finger portion having the higher free-end relative base member 12.

FIG. 2 also illustrates that the free-end 34 of finger portion 30 and free-end 36 of finger portion 32 preferably have concavely shaped edges 41 and 41a respectively that are preferably adapted to conform with the radius of curvature of the threaded member to which device 70 is to be secured. Varying the radius of curvature of edges 41 and 41a may be used to advantage in controlling the amount of torque exerted on the threaded member to secure device 70 to an article. Slot 38 extends through projection 14 towards finger portion 32 in a direction substantially transverse to axis "y—y" as previously described with respect to FIG. 1. Finger portions 30 and 32 preferably have tapered edges 35 tapered such that the width of free-ends 34 and 36 along axis "y—y" is shorter than the width of finger portions 30 and 32 at the respective line of intersection between base member 12 and finger portions 30 and 32. Tapering of finger portions 30 and 32 provides a means of controlling the flexibility thereof to the degree desired which in turn provides a means of controlling the torque required to secure device 70 to an article. Generally, finger portions 30 and 32 may be tapered in any manner to enhance the flexibility thereof with respect to base member 12 to the degree desired. Arm 22 is preferably tapered outwardly towards intersection 20 and base member 12 is preferably tapered outwardly from intersection 20 to the line of intersection between base member 12 and finger portion 30 to provide a means of increasing the flexibility between arm 22 and base member 12 to the degree desired so as to enhance the ease of application of device 70 to the article to which it is to be secured and to control the torque required to secure device 70 to the article as well as prevent damage to the article. Generally, arm 22 and base member 12 may be tapered in such a manner as to enhance the flexibility therebetween to the degree desired.

FIG. 3 is a view taken along line 3—3 of FIG. 1 which better illustrates aperture 40, lower portion 16, and higher portion 16a of the helical edge of projection 14 extending from base member 12 and slot 38 as previously described. Slot 38 extends radially outwardly through projection 14 as previously described for a distance sufficient to enable the formation of higher portion 16 and lower portion 16a of the helically deformed edge of projection 14 in the manner desired.

FIG. 4 shows a bottom view of device 70 of FIG. 1 showing opening 28 through arm 22, aperture 40 through base member 12, and slot 38 separating high portion 16 and lower portion 16a of the helically formed edge of projection 14.

Figure 5:
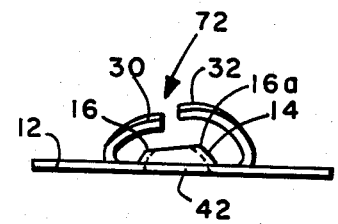
FIGS. 5, 6A and 7 show a side elevation view of other embodiments of the fastening device of the invention.

FIG. 5 shows an embodiment of the fastening device of the invention in the form of device 72. Device 72 has a substantially flat base member 12 having an opening 42 for receiving the threaded member. A generally frusto-conical projection 14 projects upwardly from base member 12 having a helically formed upper edge ending in lower portion 16 and higher portion 16a supported by slot portion 38 as previously described. Projection 14 is formed by deforming marginal edge portions of an aperture, not shown, through projection 14 that is substantially coaxially aligned with opening 42. Finger portions 30 and 32 extend angularly upwardly and inwardly over projection 14 with the free-end of finger portion 32 displaced axially higher relative base member 12 than the free-end of finger portion 30 as previously described. Although not shown, a slot portion separating higher portion 16 and lower portion 16a of projection 14 extends beneath and towards finger portion 32 in a direction substantially transverse to an axis defined between the free-ends of finger portions 30 and 32 as previously described. Device 72 is useful where it is desired to secure the device of the invention to the top of an article by suitable means.

Figure 6A:
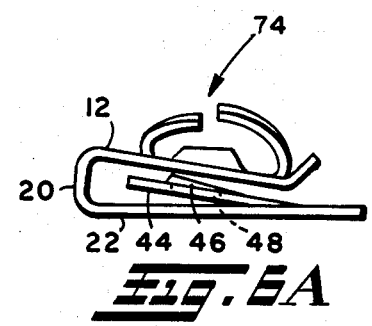

FIG. 6A shows an embodiment of the fastening device of the invention in the form of device 74. Device 74 is substantially the same as device 70 described with respect to FIGS. 1, 2 and 3 excepting that a warped portion 44 extends angularly from arm 22 in a direction towards intersection 20 between base member 12 and arm 22. An opening 48 extends through portion 44 and is substantially coaxially aligned and dimensionally adapted so that the threaded member can be inserted through opening 48 and thence through the aperture, not referenced, surrounded by projection 14. Portion 44 may additionally include a warped edge 46 to provide engagement with marginal portions of an aperture through the article to which device 72 is to be secured. Warped portion 44 further enhances the engagement between device 74 and the article to which it is to be secured.

Figure 6B:
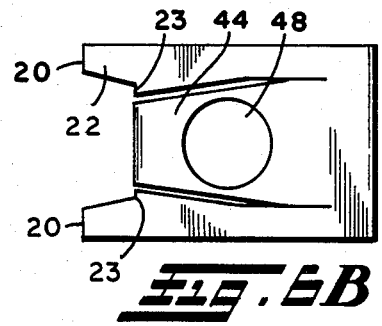
FIG. 6B shows a bottom plan view of the fastening device of FIG. 6A.

FIG. 6B shows a bottom view of device 74 of FIG. 6A. Warped portion 44 is preferably tapered as shown in FIG. 6B to improve the flexibility thereof which in turn enhances the ease with which device 74 can be applied to the article to which it is to be secured as well as providing a means of preventing damage to the article both before and after device 70 is secured to the article. Generally warped portion 44 may be tapered in any manner to enhance the flexibility between portion 44 and arm 22 to the degree desired. Arm 22 preferably has notches 23 as shown in FIG. 6B which enables the tapering of arm 22 between notches 23 and intersection 20 and of base member 12 between intersection 20 and the intersection between finger portion 30 and base member 12 to enhance the flexibility betweem arm 22 and base member 12 to the degree desired as a means of enhancing the ease with which device 74 may be applied to an article as well as providing a means of preventing damage to the article both before and after device 74 is secured to the article.

Figure 7:
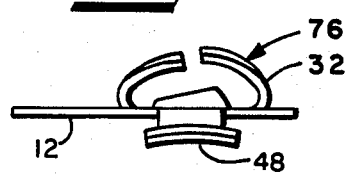
Figure 8:
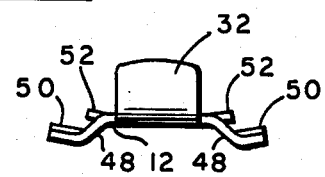
FIG. 8 shows a right side view of the fastening device of FIG. 2.

FIGS. 7 and 8 show an embodiment of the fastening device of the invention in the form of device 76. Device 76 is substantially the same as device 72 of FIG. 5 excepting a pair of flanges 48 extend from opposite sides of base member 12. Flanges 48 are dimensionally adapted to be disposed within a generally polygonal shaped opening in an article through which the threaded member is to be inserted. The upper sides of flanges 48 are drawn against the inner surface of the opening when the threaded member is tightly secured to device 76. As shown in FIG. 8, flanges 48 are preferably bowed downwardly and then outwardly from base member 12 to enhance their effectiveness in attaching to the article. Flange 48 may further include ribs 50 on the upper surface thereof as shown in FIG. 8 to even further enhance the ability of device 76 to be tightly secured to the article and may further include projections 52 cut out at the juncture between base member 12 and flanges 48 for engagement with marginal edges of the opening in the article to prevent lateral shifting movement of device 70 when in assembled position with the article. The device of the invention may include two or more of such flanges when such are desired.

Figure 9:
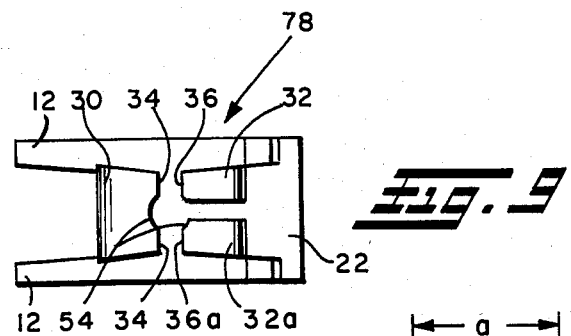
FIG. 9 shows a top plan view of another embodiment of the fastening device of the invention.

FIG. 9 shows a fastening device of the invention in the form of device 78. Device 78 is substantially the same as devices 70, 72, 74 and 76 previously described excepting that slot portion 38 extends along base member 12 and thence along finger portion 32 to the free-end 36 thereof spaced apart from free-end 34 of finger portion 30 to divide finger portion 32 into portions 32 and 32a and free-end 36 into free-end portions 36 and 36a as shown in FIG. 9. Preferably, free-end 34 and the edges of end portions 36 and 36a of free-end 36 have a concave shape 54 as shown in FIG. 9 positioned substantially coaxially with aperture 40 that is adapted to conform to the radius of curvature of the threaded member to be secured to device 78. As previously described with respect to device 70 of FIGS. 1-4, the radius of curvature of concave shape 54 may be varied to control the amount of torque desired to secure device 78 to an article. Device 78 illustrates that, although slot portion 38 preferably need only extend through projection 14 and base member 12 for a distance sufficient to enable the helical edge of projection 14 to be formed in the manner described, it may extend further along base member 12 and, if for some advantage, further along arm 32 when desired.

Figure 10:
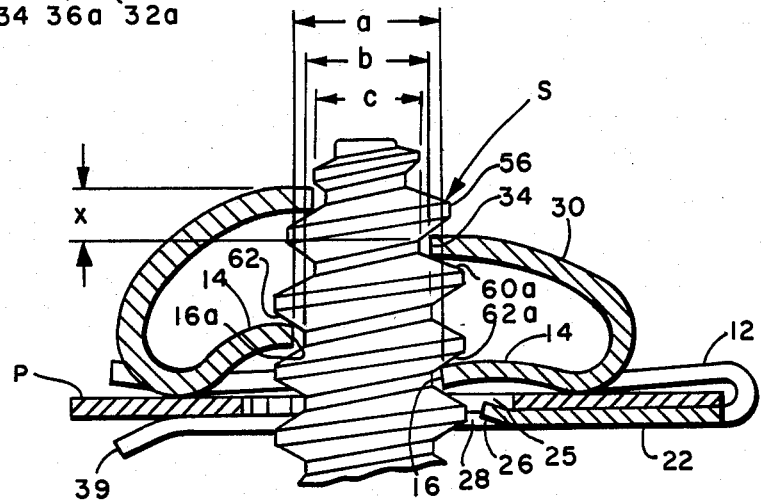
FIG. 10 shows a cross-sectional view of an embodiment of the fastening device of the invention with a threaded member inserted.
Figure 11:
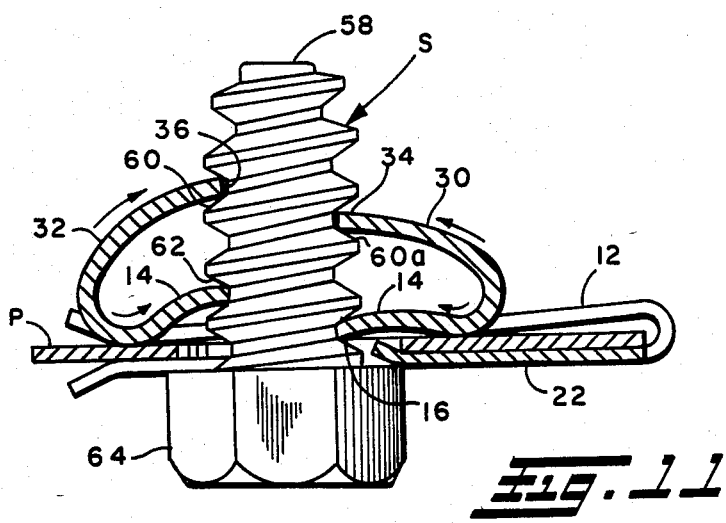
FIG. 11 shows a cross-sectional view of the fastening device of FIG. 10 after the threaded member has been tightened.

FIGS. 10 and 11 respectively show an externally threaded member "S", such as a screw, inserted into and tightly securing an article such as plate "P" to device 70 of FIGS. 1, 2, 3 and 4 excepting that arm 22 has an outwardly flared end 39 as shown in FIGS. 10 and 11 to facilitate the insertion of plate "P" into the open ended clip formed between base member 12 and arm 22.

As disclosed in U.S. Pat. No. 3,308,708, diameter "a" of the helically formed edge of the frusto-conical projection and the width "c" of the space between the free-ends of the finger portions of the device of the invention are dimensionally adapted to enable the device to be securely fastened to the threaded member. The diameter "a" of the helical edge of projection 14 is such that, when threaded member "s" is intially inserted through the aperture surrounded by projection 14, the opposite sides of the helical edge impinge against lower surfaces 62 and 62a of external threads 56 as shown in FIG. 10. Upon inserting flattened end 58 of threaded member "S" through substantially coaxially aligned opening 28 through arm 22 and opening 25 through plate "P" and into aperture 40, not referenced, and causing member "S" to move upwardly by turning generally hexagon shaped head 64 of member "S" in a clockwise direction, upper surface 60 and 60a of threads 56 are brought into contact with the free-ends 36 and 34 of finger portions 32 and 30 respectively. The free-end of finger 32 is displaced axially higher relative base member 12 by distance "X" which distance is initially preferably the same as the pitch of threads 56. Thus, upon initially inserting and turning threaded member "S", the lower end portion 16 of the helical edge of projection 14 impinges upon lower surface 62a and the higher end portion 16a of the helical edge of projection 14 impinges upon lower surface 62 of threads 56 as shown in FIG. 10 while free-end 36 of finger 32 impinges upon upper surface 60 and free-end 34 impinges upon upper surface 60a of threads 56. It is to be noted that the marginal edge 26 has been turned upwardly to engage with the edge of opening 25 through plate "P".

As shown in FIG. 11, upon the further advance of member "S" through the aperture surrounded by projection 14, a force is imparted by member "S" to initially draw the helical edge of projection 14 downwardly and axially into engagement with lower thread surfaces 62 and 62a respectively and pivot finger portions 30 and 32 radially inwardly into engagement with upper surface 60a and 60 respectively so that a counter-force is imparted by member "S" that pivots finger portions 30 and 32 in opposite directions, as shown by the arrows, and draws the helical edge of projection 14 downwardly and axially inwardly, as shown by the arrows, to urge finger portions 30 and 32 and the helical edge of projection 14 and the free-ends of finger portions 30 and 32 into tight gripping engagement with the root portions of threads 56 of member "S" having diameter "b". As for all embodiments of the fastening device of the invention, slot portion 38, not referenced, extends radially outwardly from the aperture surrounded by projection 14 towards (and beneath) the finger portion having a higher free-end relative the base member of the device in a direction substantially transverse to the axis defined between the free-ends of the finger portions. Because of the force imparted by the upper surface of threads 56 on the free-ends of the finger portions 30 and 32 and the downward force exerted by the lower surface of threads 56 on the helical edge of projection 14, the axial distance between corresponding aligned points on the helical edge of projection 14 and the free-ends of finger portions 30 and 32 is substantially greater after tightening member "S" than when member "S" was intially positioned in the device of the invention before tightening.

Although fastening devices of the invention may be made from any suitable metallic or polymeric material having suitable resiliency, strength and other properties desired for a particular application, sheet metal has been found to be of advantage in many applications for making the fastening device of the invention. Generally variations in the thickness and type of material used as well as tapering of various portions of the device may be employed to provide the degree of flexibility desired for a particular application which in turn provides a means for preventing damage to the article to which the device is secured as well as controlling the torque desired to be applied to the threaded member to secure the device to the article in addition to enabling the device to collapse upon the application of higher torque than desired so that the device collapses without damage to the article.

What is claimed is:

1. An improved fastening device (70, 72, 74, 76, 78) for securement with an externally threaded member ("S"), said device of the type having a base member (12), an aperture (40) through the base member for receiving the threaded member, thread engaging means defined by marginal portions (16, 16a) of the aperture which extend outwardly from the base member for engagement with a lower surface (62, 62a) of a thread of the threaded member when initially inserted through the aperture, a pair of resilient finger portions (30, 32) made integral with and extending upwardly and angularly inwardly from the base member on opposite sides of the aperture, said finger portions extending radially inwardly towards one another in overhanging relationship relative to the thread engaging means and having free-ends (34, 36) respectively thereof that are spaced-apart from each other along an axis ("y—y") defined therebetween and are axially off-set relative to one another such that the free-end of the one of the finger portions is higher than the free-end of the other finger portion relative to the base member, said thread engaging means including an upwardly projecting generally frusto-conical projection (14) defining upper and lower generally helical edges (16, 16a) separated by a slot portion (38) formed radially relative to the aperture in the base member, said space between the finger portion free-ends and said base member aperture edges dimensionally adapted so that, upon turning the threaded member through the aperture, a force is imparted by the threaded member to intially draw the edges downwardly and axially into engagement with the lower thread surface and pivot the finger portions radially inwardly into engagement with an upper surface (60, 60a) of the threaded member so that a counter-force is imparted by the threaded member to pivot the finger portions in generally opposite directions and draw the edges downwardly and axially inwardly to urge the finger portions and the edges into tight gripping engagement with the root portions of the threaded member with the axial distance between corresponding axially aligned on the edges and the free-ends of the finger portions substantially greater than in the intially installed position thereof, said improvement characterized by the slot portion extending radially outwardly from the aperture along the base member and thence along the finger portion having the higher free-end relative the base member in a direction that is substantially transverse to the axis defined between the finger portion free-ends to provide the device with improved ability to receive and effectively secure the threaded-member without cocking or cross-threadably engaging the threads thereof.

2. The fastening device of claim 1, wherein the base member has a resilient arm bent downwardly therefrom and extending angularly upwardly in the general direction of the base member to an end thereof that is spaced-apart from the base member for a distance sufficient to enable the arm to coact with the base member to provide a clip for attachment of the device to an article dimensionally capable of being received by the clip.

3. The fastening device of claim 2, wherein the arm includes an opening disposed below and substantially coaxially aligned with the aperture in the base member for receiving the threaded member therethrough.

4. The fastening device of claim 3, wherein the opening has a warped edge deformed to provide engagement with marginal portions of an aperture through the article through which the threaded member is to be inserted.

5. The fastening device of claim 2, including a warped portion of the arm that extends angularly upwardly from the arm in a direction towards the intersection between the arm and the base member and is dimensionally adapted to enhance the securement of the device to the article.

6. The fastening device of claim 5, wherein the warped portion includes an opening disposed below and substantially coaxially aligned with the aperture in the base member for receiving the threaded member therethrough.

7. The fastening device of claim 6, wherein the opening has a warped edge deformed to provide engagement with marginal portions of an aperture through the article to which the threaded member is to be inserted.

8. The fastening device of claim 1, wherein the base member has a generally flat configuration that is adapted to be disposed within a generally polygonal shaped opening in an article through which the threaded member is to be inserted, said base member having at least one pair of flanges that project outwardly from a juncture point with the base member on opposite sides thereof and are adapted for engagement with the article to which the device is to be secured.

9. The fastening device of claim 8, wherein the base member is cut out adjacent the juncture between the flanges and the base member to provide a projection for engagement with marginal edges of the article opening to prevent lateral shifting movement of the device when in assembled position with the article.

10. The fastening device of claim 1, wherein the finger portion free-ends are axially displaced one from another for a distance that is substantially the same as the pitch of the threads of the threaded member.

11. The fastening device of claim 1, wherein the finger portions are tapered in such a manner as to enhance the respective flexibility thereof with respect to the base member to the degree desired.

12. The fastening device of claim 2, wherein the arm and the base member are tapered in such a manner as to enhance the flexibility therebetween to the degree desired.

13. The fastening device of claim 5, wherein the warped portion is tapered in such a manner as to enhance the flexibility thereof with respect to the arm to the degree desired.

* * * * *